(12) United States Patent
Peretz

(10) Patent No.: US 7,584,045 B2
(45) Date of Patent: Sep. 1, 2009

(54) UNMANNED TACTICAL PLATFORM

(75) Inventor: Yossef Peretz, Kfar Saba (IL)

(73) Assignee: Israel Aerospace Industries Ltd., Lod (IL)

( * ) Notice: Subject to any disclaimer, the term of this patent is extended or adjusted under 35 U.S.C. 154(b) by 666 days.

(21) Appl. No.: 11/170,184

(22) Filed: Jun. 30, 2005

(65) Prior Publication Data

US 2006/0229773 A1    Oct. 12, 2006

Related U.S. Application Data

(63) Continuation-in-part of application No. PCT/IL03/01083, filed on Dec. 17, 2003.

(30) Foreign Application Priority Data

Dec. 31, 2002    (IL) ..................................... 153758

(51) Int. Cl.
*B60D 99/00* (2009.01)
*B60S 13/00* (2006.01)

(52) U.S. Cl. .................. 701/117; 701/1; 701/23; 901/1; 104/88.04; 104/48; 104/263; 180/168

(58) Field of Classification Search ................. 701/23, 701/28, 24, 25; 104/88.04, 288, 295, 188
See application file for complete search history.

(56) References Cited

U.S. PATENT DOCUMENTS 3,847,085 A * 11/1974 Rypinski ................. 104/122
4,274,335 A    6/1981 Boland
4,664,590 A *  5/1987 Maekawa ................ 414/744.1
4,996,468 A    2/1991 Field et al.
5,119,732 A *  6/1992 Lisy ......................... 104/48
5,199,358 A *  4/1993 Barratt ..................... 104/139
5,434,490 A *  7/1995 Ishida et al. ............. 318/587
5,592,883 A    1/1997 Andress, III
5,775,227 A *  7/1998 Mullen .................... 104/88.04
5,786,750 A *  7/1998 Cooper .................... 340/425.5
5,832,187 A * 11/1998 Pedersen et al. ............ 706/45
6,049,745 A *  4/2000 Douglas et al. ............. 701/23
6,056,237 A    5/2000 Woodland
6,122,572 A    9/2000 Yavnai
6,272,406 B2 * 8/2001 Alofs et al. ................. 701/24
6,339,448 B1 * 1/2002 Patrick ..................... 348/143
6,359,834 B1   3/2002 English

FOREIGN PATENT DOCUMENTS

GB        2372731        9/2002

* cited by examiner

*Primary Examiner*—Thomas G Black
*Assistant Examiner*—Lin B Olsen
(74) *Attorney, Agent, or Firm*—The Nath Law Group; Derek Richmond; Jiaxiao Zhang

(57) ABSTRACT

An unmanned tactic platform (UTP) mounted on a two-stage locomotive system of which a first locomotive stage is a significantly high-speed travel stage where the UTP reaches an arena, and a second locomotive stage is a tactical maneuver stage in which the UTP maneuvers at the arena for executing a mission.

39 Claims, 2 Drawing Sheets

UNMANNED TACTICAL PLATFORM

This is a Continuation-In-Part of International PCT Application No. PCT/IL2003/001083 filed Dec. 17, 2003 and claims priority from Israeli Patent Application no. 153758 filed Dec. 31, 2002, the contents of which are hereby incorporated by reference in their entirety.

FIELD OF THE INVENTION

The present invention is generally in the field of unmanned tactical vehicles and an associated system designed to carry out a variety of missions in different arenas. In particular the invention is concerned with a system for operating at arenas where response-time is of crucial importance, whereby a mobile tactical vehicle is suited for rapidly arriving at the arena and executing one or more missions.

BACKGROUND OF THE INVENTION

A variety of patrol, surveillance and operative missions are carried by unmanned platforms, some of which being completely automated. Examples of such instances where an unmanned operative mission is to be executed are border patrol, e.g. between nations or of various facilities such as farms, airports, sensitive zones (e.g. military or governmental institutes and facilities, power and nuclear plants, etc.), patrol along railroads and highways, conveying systems (oil pipelines, water ducts, etc.) and the like.

It has been known to use unmanned systems, such as that disclosed in U.S. Pat. No. 6,339,448 directed to an unmanned visual monitoring system used outdoors to patrol large expanses of space such as along highways, fences, railroad lines, rivers, borders, beaches, etc. where guidance and support for the unmanned surveillance camera carriage vehicle, as well as the electrical power for its operation, are provided to the carriage and camera by conductive track cables. At a remote control center location from the carriage, an operator can control the movement of the vehicle and the operation of the video camera.

Another monitoring arrangement is disclosed in U.S. Pat. No. 5,786,750 directed to a self-propelled remotely controlled pilot vehicle adapted for use on railroad tracks to monitor hazardous conditions and obstacles on the railroad tracks. The pilot vehicle is equipped with a sensor array which measures a variety of different parameters and with a television camera which provides a visual image of the railroad track ahead of the pilot vehicle to a train engineer. Information gathered by the pilot vehicle sensor array is supplied to a computer on board the pilot vehicle and is also transmitted to the train to enable the engineer to be apprised of conditions existing on tracks ahead of the train in order to have time to react to dangerous situations on the railroad tracks.

Whilst the above U.S. patents are directed to surveillance and monitoring of various conditions, it has also been known to use unmanned vehicles and platforms for carrying out different missions without risking the lives of humans. Examples of unmanned command platforms used for carrying out operative tasks are an unmanned aircraft suitable for carrying out a variety of missions such as scouting over hostile territories, bombing, carrying various payloads, guiding missiles, etc. Still another example is disclosed in U.S. Pat. No. 6,359,834 directed to a mine neutralization device (MND) deployed from a launch platform, such as aircraft or a surface craft, and travels under water to destroy a mine. Command signals are coupled to the MND through suitable communication lines to control the MND on its way to the mine. The MND is provided with vision and sonar systems to provide optical and acoustic data signals to the launch platform where command signals are transmitted to the MND for detonating explosive aboard the MND to destroy the mine.

An unmanned vehicle designed to execute a mission may be remotely controlled by a remote command control center, e.g. as described in U.S. Pat. No. 6,359,834. Alternatively, or in combination, the unmanned vehicle may be controlled and operated by a decision making system (expert system such as fuzzy-logic, etc.) as disclosed, for example in U.S. Pat. No. 5,832,187 or 6,122,572, the latter directed to a vehicle designed for execution of a mission and a programmable decision unit capable of making and controlling the execution of the mission whereby controlling the execution of the mission is carried out in an autonomous fashion such that the vehicle becomes an autonomous vehicle.

In many cases the response time in which the tactical platform reaches an arena in which it is to execute a mission is of significance and even may be critical in some hazardous conditions.

Thus, it is a primary object of the present invention to provide an unmanned tactical platform (UTP) designed to reach an arena at significantly high speed and in a short time, for execution of one or more missions at the arena.

SUMMARY OF THE INVENTION

The present invention calls for an unmanned tactical platform (UTP) mounted on a two-stage locomotive system in which a first stage is a significantly high-speed travel stage where the UTP reaches an arena, and a second stage is a tactical maneuver stage in which the UTP maneuvers at the arena for executing a mission.

The term tactical platform as used hereinafter in the specification and claims denotes any of a variety of utility platforms designed and equipped for executing one or more missions. Several examples of such missions are:
  Fire-fighting/hazardous material detection and control;
  Boarder/territory patrol (e.g. national boarders, prisons, camps, airports, farms, factories, etc);
  Terror/hostile activity fighting;
  Scouting and intelligence; and
  Support in emergency events.

According to the invention there is provided an unmanned tactical platform (UTP) designed and equipped for execution of tactical missions and being displaceable along a predetermined path by means of a two-stage locomotive system, and comprising the following stages:
  (i) displacing the UTP along said path, at significantly high speed, between any location on said path an arena, displacement being facilitated by a first locomotive stage system; the first stage is defined as substantially fast displacement along a predetermined rout or path with some sort of guidance required;
  (ii) executing one or more tactical missions at said arena, where said UTP is fitted for self maneuvering at the arena for executing its mission, said maneuvering being facilitated by a second locomotive stage.

While executing its mission, the UTP may remain engaged with the first locomotive stage system or alternatively it can detach from said locomotive stage system for tactical maneuvering at the arena. Optionally, after completing the mission, the UTP may re-engage with the first stage locomotive system for transferring to another arena or to a base station.

The predetermined path is a defined route extending between potential or pre-defined arenas, where the locomotive system is capable of displacing the UTP along said path at significantly high speed. The path may be equipped with means to facilitate fast locomotive of the locomotive system along said route, e.g. a monorail or rails, a cable, a magnetic induction transfer system (e.g. a so-called MAGLEV system), a virtually inductive electric propelling system, a chained track, etc., where the locomotive system is respectively fitted for cooperation with such means. However, the path may also be a road, a paved path or a consolidated soil path suited for fast displacement of the UTP there along. For example, the fast locomotive stage of the locomotive system may be a vehicle powered by various systems e.g. fuel or electric engine, jet, pneumatic, magnetic, etc. and combinations thereof. There may also be different mechanical displacing arrangements such as a catapult system, stored mechanic energy, etc.

However, for the tactical maneuver stage, the UTP may require other displacement means such as track motivation or a suitable suspended wheeled system to facilitate locomotive of the UTP also at poor transferability terrain, though not at high speed. However, the first and second locomotive stages may be facilitated by a single mechanism. Furthermore, the locomotive system may be a combined system, i.e. one comprising more then one system, providing also backup in case of failure of one system.

When the fast locomotive stage and the second stage (the tactical maneuvering stage) are carried out by different locomotive systems, the arrangement may be such that the UTP is detachably mounted on a first stage transfer system for significant fast speed displacement, and upon arrival at the arena it detaches from said first stage transfer system and is deployed to the arena over an independent, second stage transfer system for tactical maneuver.

It should further be appreciated that at the first stage the UTP may be displaced according to one of the following options:

1. the UTP is engaged to a guiding track associated with a power transporting system, the later entailing displacement of the vehicle (e.g. where the vehicle is engaged onto a rail or other form of guide track, and where displacement of the vehicle is by a power mechanism associated with said guiding transporting system);
2. the UTP is engaged to a guiding track though the UTP is self propelled (e.g. where the vehicle is engaged onto a rail or other form of guide track, where displacement of the vehicle is by a power mechanism associated with the vehicle);
3. UTP is not engaged to any guide means and it is self propelled (e.g. where the vehicle is self propelled and it travels along a predetermined smooth and fast path, possibly guided by a GPS aided system, a video control system, etc);

When the UTP reaches the arena, it then enters the second stage, where it disengages from the guiding track (where the UTP is displaced at the first stage according to either options 1) or 2) above) or immediately shifts into the second stage to execute its tactic mission at the arena by its self maneuvering ability. Where the UTP displaces at the first stage according to option 3) above, It may deploy into the second stage by selecting a path other then that of said fast path, depending on real time decisions made depending on various parameters, e.g. topography at the arena, real time images or pre-stored images and occurrences at the arena, where the vehicle can then maneuver at the arena also at poor topography conditions.

At the second stage, the UTP may engage with a mission force (e.g. troops at or adjacent the arena) where said mission force takes control over the UTP for controlling its tactic operation at the arena. This may be carried out by remote control means or by actual riding.

In case the UTP encounters an obstacle at the first stage, it may be programmed for spontaneously deployment into the second stage, or may do so per remote control instructions. The UTP may override the obstacle and then revert to the first fast displacement as per the first stage (including re-engagement with the guiding track) or, depending on real time decision making, it may continue its mission at the second stage. An obstacle may in fact be some sort of occurrence which may result in termination of stage one and immediate deployment into stage two of the UTP.

The UTP is equipped with information collecting sensors for picking up signals responsive to different conditions of the UTP and of the arena, along the path and at the arena. For example, the information may be image signals, location and position signals, speed and acceleration signals, temperature signals, sound signals, etc. Such information will typically be transferred to a control center by different wire or wireless means.

For executing a mission, the UTP will include dedicated equipment, depending on the intended mission/missions, e.g. weapon systems, pyrotechnic equipment, illumination and audio equipment, fire-fighting equipment, hazardous material handling equipment, robotic manipulators, electronic equipment e.g. communication, intelligence/surveillance and imaging equipment (day/night; through-smoke; 3D vision, etc.), or any other payload. The tactical platform may be a module pre-designed for certain missions and adapted for mounting on a locomotive system, or it may be in the form of a platform adapted for mounting thereon the equipment by a variety of adaptors.

Controlling the UTP may be facilitated in several ways and may comprise several control and command modules. For example, there may be a manned control center (CC) receiving information from the UTP and in turn generating control signals for maneuvering and operation of the UTP. Alternatively, there may be provided a decision making system fitted on the UTP where it becomes an autonomous unit, though information may nevertheless be transferred to a CC (optionally with an override control option).

According to some other embodiments, the UTP may be comprise a programmable control or decision unit capable of managing and controlling the execution of one or more missions according to different mission plans and scenarios. Accordingly, the UTP may be programmed for carrying out a predetermined routine (e.g. patrol along the path according to certain routine patterns) and in case of an event at an arena, control of the UTP may then be taken over by a decision making unit (manned or unmanned) for controlling signal detection, signal interpretation and response of the UTP.

However, the UTP may also be designed as a completely autonomous unit for handling different scenarios occurring along the path and at arenas adjacent the path. Alternatively, some activities of the UTP may be controlled autonomously and others may be controlled by manned control systems, pre-programmed or upon demand.

BRIEF DESCRIPTION OF THE DRAWINGS

In order to understand the invention and to see how it may be carried out in practice, some embodiments will now be described, by way of non-limiting examples only, with reference to the accompanying drawings, in which:

FIGS. 1A and 1B are schematic illustrations of an unmanned tactical platform (UTP) system in accordance with the present invention, wherein:

FIG. 1A illustrates the UTP at a first locomotive stage during a patrol mission; and FIG. 1B schematically illustrates a UTP control center;

FIGS. 2A and 2B illustrate a fire fighting UTP operating along a pipe-line, wherein:

FIG. 2A illustrates the UTP at the first stage, engaged with a rail locomotive system extending along the pipe-line; and FIG. 2B illustrates the UTP at the second stage, fighting a fire.

DETAILED DESCRIPTION OF THE INVENTION

Figure 1A:
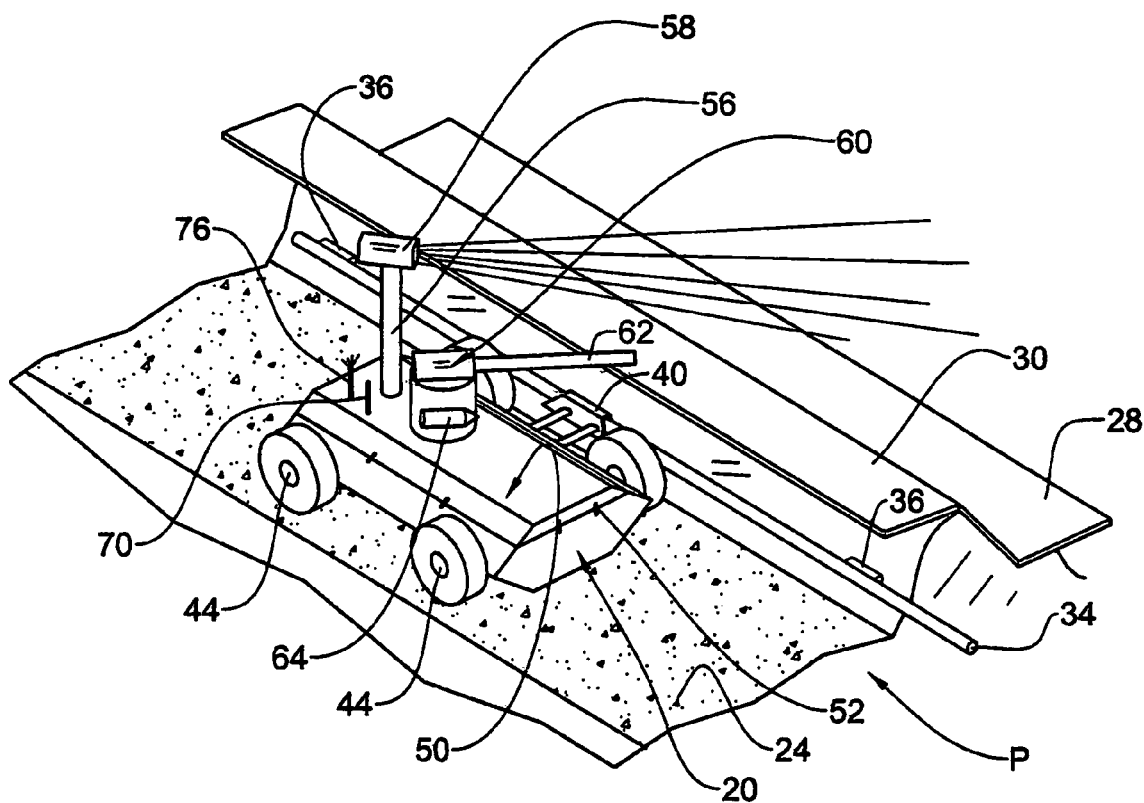
Figure 1B:
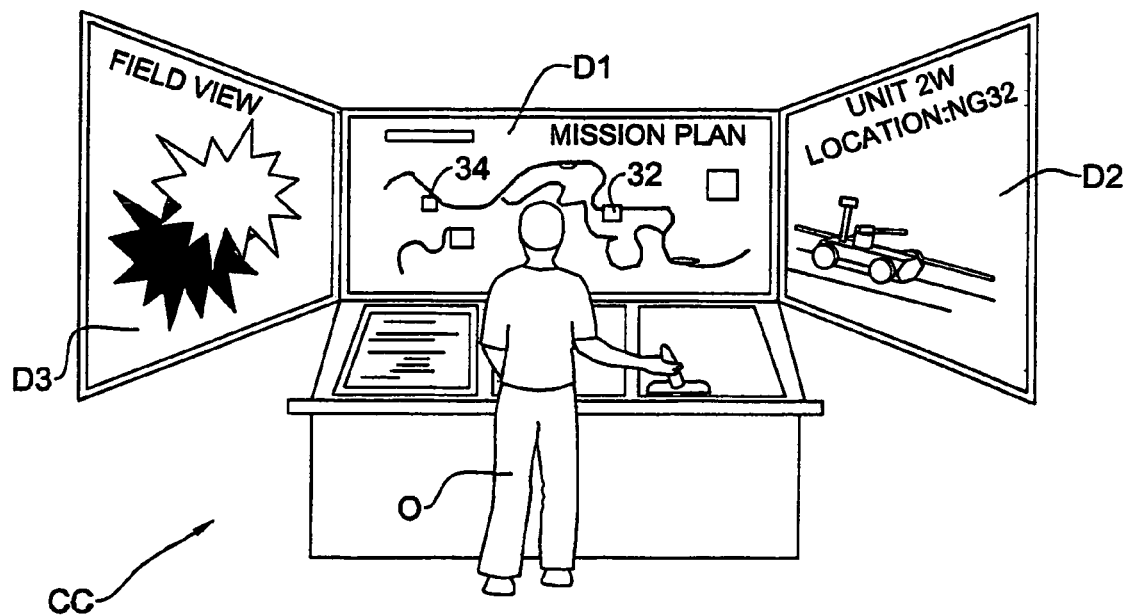

Attention is first directed to FIGS. 1A and 1B of the drawings illustrating an unmanned tactical platform (UTP) designed for along-the-border patrol and tactical missions. The term "border" as used in the present case is referred to in its broadest meaning, e.g. borders between countries or states, borders of sensitive locations such as airports, power and nuclear plants, farms and any other land property which one may wish to protect from intruders.

A path is defined around the boundaries of the territory to be protected and suitable arrangements are then provided for the UTP, generally designated 20, to travel along said path, a segment of which is illustrated in FIG. 1A and designated P. However, in order to shorten the arrival time of the UTP to an arena there may be paths traversing the territory rather or in addition to a path along the boundaries of the territory.

The path P is formed with a paved or tightly pressed track 24 extending along an outwardly facing ramp 28 fitted with a protection shield/fence 30 and optionally, with additional delaying obstacles, e.g. fences, mines, etc.

Extending along the ramp 28 there is a monorail 34 which secures the ramp by connectors 36. As will be explained hereinafter, the monorail 34 supplies power to the UTP 20 and transfers communication between the UTP and a remote control center, generally designated CC in FIG. 1B.

The UTP 20, though schematically illustrated in FIG. 1A, comprises a locomotive system which in the present embodiment comprises a monorail engagement mechanism or monorail system 40 and a suspended wheeled system 44. The monorail system is a so-called first stage locomotive system adapted for propelling the UTP 20 along the path P at significantly high speed, say for example over 60 km/hr. According to one embodiment, the UTP 20 may be propelled by the monorail system though driven over its wheeled system 44. In accordance with a different embodiment, the UTP 20 may be elevated from the ground while at its first stage and may be supported only by the monorail 34.

The monorail system 40 is designed for fast disengagement and optionally re-engagement of the UTP 20 with the monorail 34. The arrangement is such that when the UTP 20 arrives at an arena it is capable of disconnecting from the monorail 34 and then the locomotive system transfers to its second stage adapted for tactical maneuvers at the arena by means of the suspended wheel system 44. It is apparent that such maneuvering is significantly slower and is not suitable for long distance travel or fast maneuvering. Typically, the wheeled system 44 is capable of maneuvering over difficult terrain, e.g. rocky, muddy and otherwise obstacled terrain.

The UTP 20 is fitted with a modular payload 50 attached to the body of the UTP by securing latches 52. In the present example, payload 50 is a combined module pre-designed and furnished for a patrol mission including surveillance, imaging, target finding, and fire power, etc. For these purposes, the payload 50 comprises a telescopic mast 56 fitted at its top end with an imaging model 58 manipulable with respect to the mast 56 which comprises a spotlight/floodlight unit as well as night vision and imaging means, as known, per se. The payload 50 further comprises a firing unit generally designated 60 comprising a machine gun 62, a grenade thrower 64 (e.g. for projection of smoke or explosive grenades, etc.) and other tactical means, as may be required.

The payload 50 is further fitted with a communication system for communicating with a remote control center and is equipped for that purpose with suitable antennas 70. There is further provided tactical surveillance equipment, e.g. sound pickup, radar, etc. designated at 76.

As already mentioned, the UTP 20 is controlled and remotely operated by a control center CC schematically illustrated in FIG. 1B, being a manned command center. This control center CC continuously receives information relating to the location and position of the UTP 20, e.g. by means of a GPS system, which information, at the first transfer stage may be transmitted to the control center via the monorail 34 or other suitable communication means attached thereto, for example, by radio communication, as known in the art.

In the present example, the control center is a remote manned control CC center. The control center, however it may be a completely automated control system comprising one or more decision-making units (e.g. fuzzy logic systems). The system may also be such that during a routine patrol mission the UTP 20 is controlled by an automated decision-making system fitted aboard the UTP or fitted at the remote control center CC. However, upon occurrence of a non-routine scenario, control may be taken over by an automated decision-making system or by a manned control system.

The information received by the control center CC will typically include all relevant information concerning the location and position of the UTP 20 as well as tactical information such as a dynamic image of the arena, image analysis, potential target information, etc. When the UTP 20 is fitted with surveillance or communication equipment, the relevant information may be picked up and transferred to the control center CC for decoding (intelligence interpretation).

FIG. 1B illustrates the control center CC with an operator O is situated adjacent three large displays D1, D2 and D3 wherein D1 is a general tactical mission plan giving the operator a general overall view of the mission and the location of one or more UTPs 20. Display D2 provides information concerning the location and position of a selected UTP 20 including all the associated parameters, e.g. speed, acceleration, fire power, etc. Display D3 provides a field view provided by cameras fitted on the selected UTP 20. The control center CC comprises control equipment for controlling locomotive of the UTP 20 along its first stage, for disengaging it from the monorail 34 and for maneuvering it at the second tactical maneuvering stage. Such maneuvering controls typically comprise a joystick or other simulating control as known per se.

The principle of operation of the UTP 20 in accordance with the present invention is significantly rapid arrival of the UTP to the arena of an event and then tactical maneuvering as may be required. This is achieved by the two-stage locomotive system wherein the UTP 20 travels along the predetermined path P at a significantly high speed, say for example, over 60 km/hr and upon arrival at the arena it facilitates the second stage being a self-propelled maneuvering stage for tactical movement required for carrying out one or more missions.

In some cases the predetermined path P may be fitted with two fast tracks to facilitate cooperation of two or more UTPs 20 to thereby ensure rapid arrival of a UTP to an arena (according to such a scenario, a nearest UTP will be deployed to the arena by a decision making system) and further, to provide the support in case of failure of one of the UTPs.

However in some scenarios the UTP 20 will not detach from the first stage locomotive system. An example of such a scenario is the rapid arrival of the UTP 20 to an arena with the UTP maintaining its position where it can provide a view of the field or fulfill some other task, e.g. serve as a target pointer, radar unit, etc.

Figure 2A:
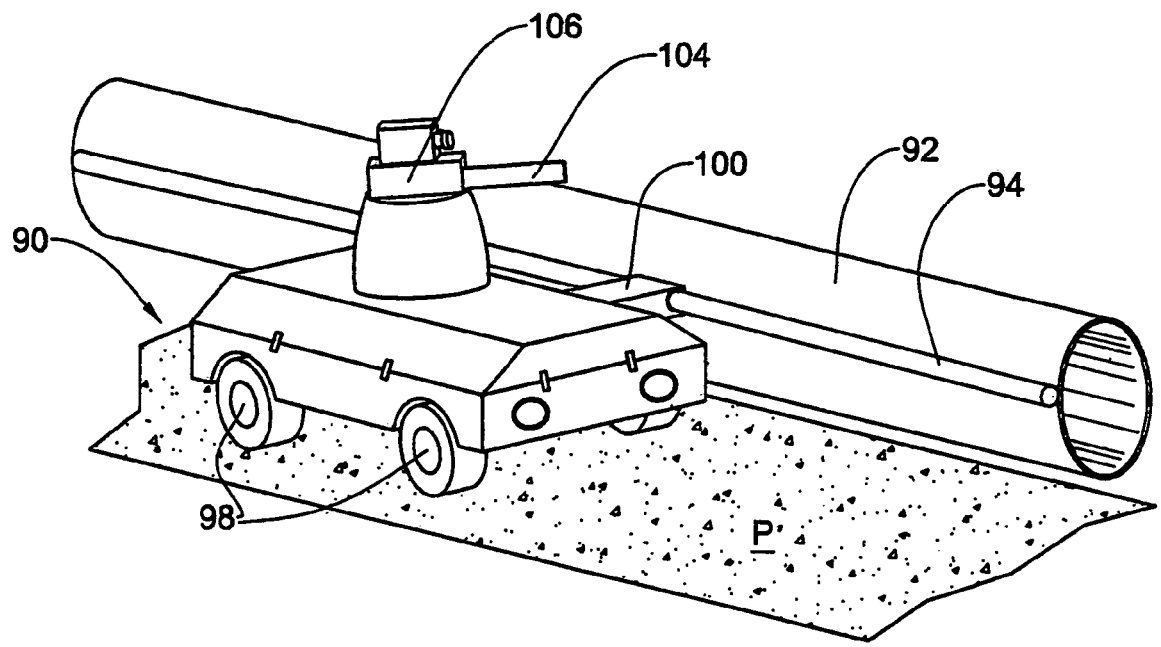
Figure 2B:
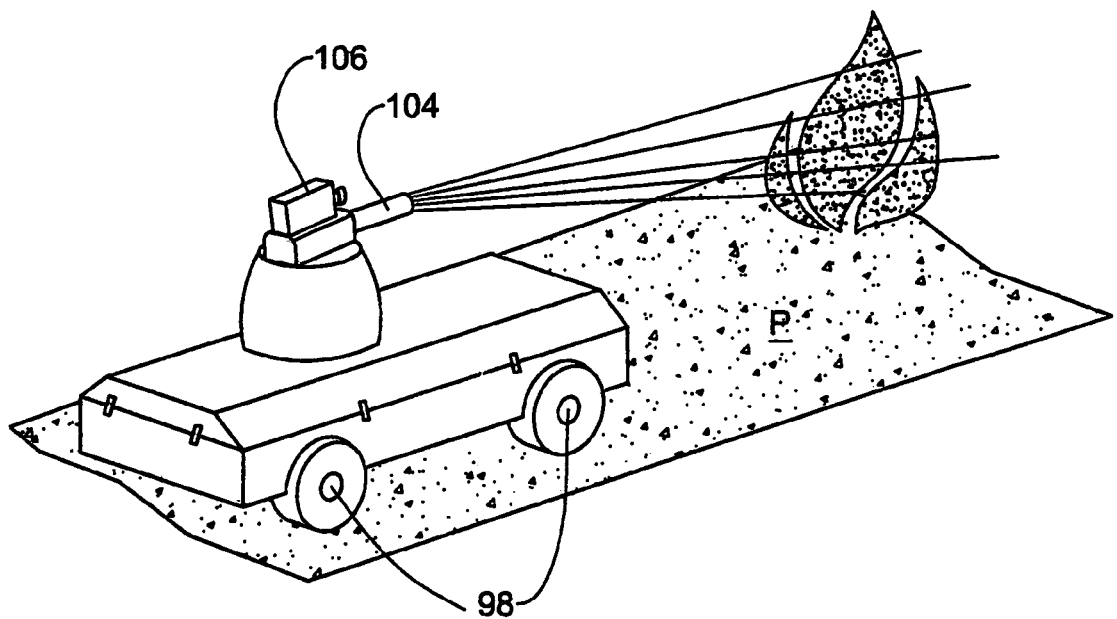

Turning now to the embodiment illustrated in FIGS. 2A and 2B, there is illustrated a pipeline patrol and fire fighting UTP, generally designated 90, fitted for patrolling along a pipeline 92 in accordance with a pre-programmed patrol pattern.

The UTP 90 is detachably engaged with a monorail 94 for propelling it at significantly high speed along path P which is a paved track extending parallel to the pipeline 92. At the fast stage, the wheel system 98 of the UTP 90 is a free-drive system wherein the propelling is obtained by the driving mechanism 100 attachable to the monorail 94. However, upon detaching from the monorail 94 the UTP 90 becomes an independent vehicle (FIG. 2B) wherein a wheel system 98 is propelled by means of an integral power system. Increasing the UTP's maneuvering ability may be obtained, for example, by introducing a wheel system 98 where the wheels or tracks at opposite sides of the vehicle rotate in opposite directions.

The UTP 90 is fitted with fire extinguishing means such as a foam gun 104, water jet guns 106, etc. Within the body of the UTP 90 is typically a large container holding one or more fire extinguishing agents. Furthermore, it is preferable that the UTP 90 be provided with through-smoke vision means and illuminating means (pyrotechnic or electric illuminating force) whereby an image of the arena may be transmitted to the control center CC.

The UTP 90 may also be provided with fire and smoke sensors for generating an alert system immediately upon detection of a fire. Other sensors may be provided as well for sensing leaks along the pipeline 92.

Control of the UTP 90 may be facilitated in accordance with any of the hereinabove discussed manners.

Also, at the second stage, the UTP may engage with a mission force (e.g. troops at or adjacent the arena) where said mission force takes control over the UTP for controlling its tactic operation at the arena. This may be carried out by remote control means or by actual riding.

Although two particular embodiments have been disclosed with reference to the drawings, it should be clear that they are not intended thereby to limit the scope of the invention, but rather the disclosure is intended to cover all modifications and arrangements falling within the scope and spirit of the present invention, mutatis mutandis.

For example, the locomotive system may be of various forms and combinations wherein the first stage locomotive system may be any suitable arrangement providing that the UTP is displaced along the path at significantly high speed. Regarding the second stage, suitable arrangements should be provided to facilitate maneuvering of the UTP over different types of terrain. The engagement of the UTP with the propelling arrangement of the first stage should facilitate fast disengagement and optionally re-engagement whereby the UTP may be transferred between arenas quickly and efficiently.

Furthermore, it should be noted that the tactical payload of the UTP may be predesigned and equipped for carrying out one or more specific missions whereby such payloads may be removably attachable modules fixable over a body vehicle of the UTP or, the UTP may be predesigned and dedicated for particular missions.

In case the UTP encounters an obstacle at the first stage, it may be programmed for spontaneously deployment into the second stage, or may do so per remote control instructions. The UTP may override the obstacle and then revert to the first fast displacement as per the first stage (including re-engagement with the guiding track) or, depending on real time decision making, it may continue its mission at the second stage. An obstacle may in fact be some sort of occurrence which may result in termination of stage one and immediate deployment into stage two of the UTP.

Similarly, control and command of a UTP in accordance with the present invention may be carried out in a variety of different ways such as central control centers, automated decision making centers, etc., or combinations of such methods.

The invention claimed is:

1. A system for rapid deployment of an unmanned tactical platform (UTP), to an arena in a territory via a predetermined route on said territory and for maneuvering said UTP at the arena for executing a mission, comprising:
   a first locomotive system and a ground vehicle,
      said ground vehicle comprising a self-propelled second locomotive system and said UTP, said UTP being mounted onto said second locomotive system,
      said ground vehicle being configured for unmanned operative missions and said second locomotive system being configured for enabling tactical maneuvering of said ground vehicle on said territory at said arena,
      said ground vehicle being detachably mounted to said first locomotive system,
      said first locomotive system being configured for propelling said ground vehicle at significantly high-speed travel along said predetermined route to said arena when said ground vehicle is connected to said first locomotive system,
      wherein said first locomotive system comprises a propelling system secured to the ground and extending along said predetermined route.

2. The system according to claim 1, wherein said ground vehicle comprises an arrangement for detachably mounting to said first locomotive system and for selectively disengaging from said first locomotive system.

3. The system according to claim 1, wherein said second locomotive system comprises self/independent locomotive means.

4. The system according to claim 1, wherein said second locomotive system comprises any one of a suspended wheeled system or track motivation.

5. The system according to claim 4, wherein wheels or tracks at opposite sides of the ground vehicle are configured for rotating in opposite directions to increase maneuvering ability.

6. The system according to claim 1, wherein the unmanned tactical platform comprises a modular payload designed and equipped for executing one or more missions.

7. The system according to claim 6, wherein the unmanned tactical platform is a module pre-designed and equipped for execution of certain one or more missions and adapted for removable mounting on the second locomotive system.

8. The system according to claim 6, wherein the unmanned tactical platform is a module in the form of a platform adapted for mounting thereon a payload by a variety of adaptors.

9. The system according to claim 8, wherein the payload comprises one or more of weapon systems, pyrotechnic equipment, illumination and audio equipment, fire-fighting equipment, hazardous material handling equipment, robotic manipulators, communication equipment, intelligence/surveillance equipment and day/night vision and imaging equipment.

10. The system according to claim 1, wherein said ground vehicle is equipped with information collecting sensors for generating information signals responsive to different conditions of the UTP and of the arena, along said predetermined route and at the arena.

11. The system according to claim 10, wherein the information collecting sensors comprise at least one of location and position sensors, speed and acceleration sensors, image sensors, temperature sensors, radar, sniffer and acoustic sensors.

12. The system according to claim 10, wherein said information signals from said information collecting sensors are transferred to a control center by wire or wireless communication means.

13. The system according to claim 1, wherein said ground vehicle is propelled by means of an integral power system.

14. The system according to claim 1, wherein the UTP is configured to be engaged with a guide system during said high-speed travel.

15. The system according to claim 1, wherein said high speed travel of said first locomotive system comprises an average speed exceeding about 60 Km/h.

16. The system according to claim 1, wherein said ground vehicle is configured for disengagement from said first locomotive system after arriving at said arena.

17. The system according to claim 16, wherein said ground vehicle is configured for re-engagement with said first locomotive system.

18. The system according to claim 1, wherein said first locomotive system comprises means to facilitate fast locomotion of the first locomotive system along said predetermined route and wherein said ground vehicle comprises a powered vehicle fitted for cooperation with such means.

19. The system according to claim 18 wherein said locomotive system comprises different mechanical displacing arrangements including any one of a catapult system, stored mechanic energy.

20. The system according to claim 18, wherein said predetermined route is a path formed with a paved or tightly pressed track.

21. The system according to claim 18, wherein said first locomotive system comprises two tracks for facilitating cooperation with two or more said ground vehicles.

22. The system according to claim 18, said predetermined route is a path further comprising a protection field fence and optionally further comprising delaying obstacles.

23. The system, according to claim 18, further comprising a control system.

24. The system according to claim 23, wherein the control system is mounted onboard said UTP, whereby the UTP is autonomous.

25. The system according to claim 23, wherein the control system comprises an automated decision-making system.

26. The system according to claim 23, wherein the control system is a remote manned control system.

27. The system according to claim 26, wherein said ground vehicle is equipped with information collecting sensors for generating information signals responsive to different conditions of the UTP and of the arena, along said predetermined route and at the arena, wherein the control system is remote and wherein said information signals are received at a control center for processing thereof and in turn generating control signals for maneuvering and operation of the UTP.

28. The system according to claim 23, wherein the control system comprises a pre-programmed controller for controlling and managing the UTP during execution of one or more missions according to different pre-defined mission plans and scenarios.

29. The system according to claim 28, wherein the control system is programmed for carrying out a predetermined routine mission and in case of an event at an arena at or adjacent the predetermined route, further control of the UTP is taken over by a decision making system.

30. The system according to claim 18, wherein said means to facilitate fast locomotion of the first locomotive system comprises any one of: a monorail or rails, a cable, a magnetic induction transfer system including a so-called MAGLEV system, a virtually inductive electric propelling system, a chained track, provided along said predetermined route.

31. The system according to claim 18, wherein said ground vehicle of said first locomotive system is powered by various systems including any one of fuel or electric engine, jet, pneumatic, magnetic, or combinations thereof.

32. A method for rapid deployment of an unmanned tactical platform (UTP) to an arena in a territory via a predetermined route on said territory and for maneuvering said UTP at the arena for executing a mission, comprising:

providing a first locomotive system and a ground vehicle, said vehicle being configured for unmanned operative missions and comprising said UTP for executing said mission, said ground vehicle also comprising a self-propelled second locomotive system configured for enabling tactical maneuvering of said ground vehicle on said territory at said arena, wherein said UTP is mounted to said second locomotive system;

propelling said ground vehicle to said arena at significantly high-speed by means of said first locomotive system along said predetermined route while said ground vehicle is removably attached to said first locomotive system, wherein said first locomotive system is configured for propelling said ground vehicle at significantly high-speed travel along said predetermined route to said arena when said ground vehicle is connected to said first locomotive system and comprises a propelling system secured to the ground and extending along said predetermined route; and enabling tactical maneuvering of said ground vehicle on said territory at said arena by means of said second locomotive system.

33. The method according to claim 32, wherein the said ground vehicle is undetached from said first second locomotive system at said arena.

34. The method according to claim 32, wherein the said ground vehicle is detached from said first locomotive stage after arriving at said arena via said first locomotive system.

35. The method according to claim 32, wherein the first locomotive system comprises a support track continuously extending along portions of the said predetermined route and fitted for propelling the ground vehicle at significantly high speed; said ground vehicle being detachably engageable with the track.

36. The method according to claim 32, comprising a stage of detaching the ground vehicle from the first stage locomotive system and deploying it from the predetermined route into the arena.

37. The method according to claim 36, wherein the ground vehicle is re-engageable with the locomotive system of the first locomotive state for displacement along the predetermined route.

38. The method according to clam 32, wherein said predetermined route comprises a border.

39. The method according to claim 32, wherein said first locomotion system transfers said ground vehicle at an average speed exceeding about 60 Km/h.

* * * * *